United States Patent [19]

Ammons

[11] Patent Number: 4,786,038

[45] Date of Patent: Nov. 22, 1988

[54] HANGER'S HELPER TOOL

[76] Inventor: Frank A. Ammons, 3246 W. 4960 South, Salt Lake City, Utah 84118

[21] Appl. No.: 15,433

[22] Filed: Feb. 17, 1987

[51] Int. Cl.[4] .............................................. B23Q 3/18

[52] U.S. Cl. ........................................ 269/60; 269/97; 269/904

[58] Field of Search ........................ 269/37, 41, 45, 60, 269/152, 155, 904, 97–98; 254/103

[56] References Cited

U.S. PATENT DOCUMENTS 3,927,864 12/1975 Meierkort et al. .................. 254/103

4,683,633 8/1987 Loris ..................................... 269/95

FOREIGN PATENT DOCUMENTS 646909 11/1928 France ................................. 269/60

2517238 11/1981 France ................................. 269/41

*Primary Examiner*—Robert C. Watson

*Attorney, Agent, or Firm*—K. S. Cornaby

[57] ABSTRACT

A device for use in building construction applications to position wallboard or like materials in place by means of attachment of the device to a wall stud, thereafter placing the wallboard member in the positioning bracket of the apparatus and engaging the mechanism to securely hold the wallboard in place. Use of the apparatus so described thus allows a single workman to position, adjust and attach the wallboard by nail or screw means to existing wall stud structures.

3 Claims, 2 Drawing Sheets

HANGER'S HELPER TOOL

BACKGROUND OF THE INVENTION

In the housing and commercial building industry, it is a well known fact that wall heights in structures tend to shrink or settle, which can cause ripples, waves, or other problems to the wallboard on the walls. It has therefore become good practice in buildings with wood studs to install the wallboard tight against the ceiling and to leave a sufficient gap between the wallboard and the floor to absorb any shrinking or settling, thus avoiding buckling or rippling of the wallboard. Wallboard is manufactured in panels up to sixteen feet long, but only four feet in width. Therefore it has also become good practice to install the panels horizontally on walls of more than four feet of horizontal length. This practice builds a stronger wall and minimizes the number and length of joints between panels, which joints must be covered to produce a smooth, finished wall. The foregoing good practices are most efficiently accomplished by installing the panel on the wall, horizontally, against the ceiling first. This panel must be held up tight to the ceiling while it is fastened to the wall. All subsequent panels on the same wall must be held up tight to the bottom edge of the panel above them while they are fastened to the wall.

This has been accomplished either manually, requiring at least two workmen to perform the task, or by some means of mechanical apparatus as disclosed in prior art inventions. Said prior art has focused on providing a device which may allow a single workman to perform the steps as outlined above, but has not met the need for an easily transported device which does not require assembly.

This invention meets the desirability of portability by virtue of its dimension not exceeding 18 inches in length. It is easily transported in one hand, set in operational position by one individual, and does not require any pre-assembly of parts or multiple consecutive adjustments of the device to achieve the desired placement of wallboard.

SUMMARY OF THE INVENTION

The invention herein provides a means for placement and positioning of wallboard in the construction of buildings by attachment of the device to a wall stud located at a point approximately one-half of the length of the wallboard relative to its position when hung. The device is attached to the stud at a point approximately equal to the width of the wallboard measured from the top of the wall or from the wallboard below which the present wallboard will be hung. The device may be attached to the wall stud by a C-clamp, a vise grip, or a clamp consisting of a fixed end and an eccentrically mounted serrated wheel which tightens against the wall stud, as a crank to which the wheel is connected, is turned; each form of attachment would constitute a varying embodiment of the invention.

This invention consists of a metal bracket, into which the bottom of the wallboard is cradled, connected to an elongated hollow metal housing which contains the mechanism which accomplishes adjustment to the bracket in an upward direction so as to secure the wallboard, loaded into the bracket, against the ceiling or next adjoining wallboard. The mechanism of adjusting the bracket upwardly differs in different embodiments. The embodiments illustrated hereafter show movement by means of a threaded shaft connected to a cogwheel, which articulates transversely with a second cogwheel which is attached to a crank for executing the adjustments. Bevel gears may be used in place of cogwheels. A second embodiment illustrates a spring loaded lever which, when engaged upwardly, produces tension on two springs thus executing the adjustment; yet a third embodiment illustrates a hydraulic system of producing adjustment of the bracket; and, a fourth embodiment illustrates a rack and pinion system of executing adjustment of the bracket. Combined embodiments as discussed above, as well as other embodiments, will be obvious to those skilled in the art and will become more apparent in review of the illustrated drawings.

Once a panel has been positioned into place in the bracket and against the wall, the device which is supported by the stud to which it is clamped, will support the weight of the panel. The workman must push the panel against the wall with one hand, while operating the device with his other hand, causing the bracket to exert upward pressure on the panel until the panel is held securely between the bracket and the ceiling, or between the bracket and the bottom edge of the panel above. The workman can then step back to assess the placement of the panel and may make any adjustments to the position of the panel, before fastening the panel to the wall. After the panel is fastened to the wall, the device may be removed and clamped to a stud in the next location where it will be used.

The object of this invention is to provide a small and portable device for use in hanging wallboard, said device being capable of being put into operational use without assembly of parts.

A further object is to provide a device which will allow for precise adjustment to the wallboard, once in place, by movement of the board rather than the device.

A further object is to provide a device which eliminates the need for human effort to hold the wallboard in place while it is being fastened to the wall with nails or screws.

DETAILED DESCRIPTION OF THE PREFERRED EMBODIMENTS

Figure 1:
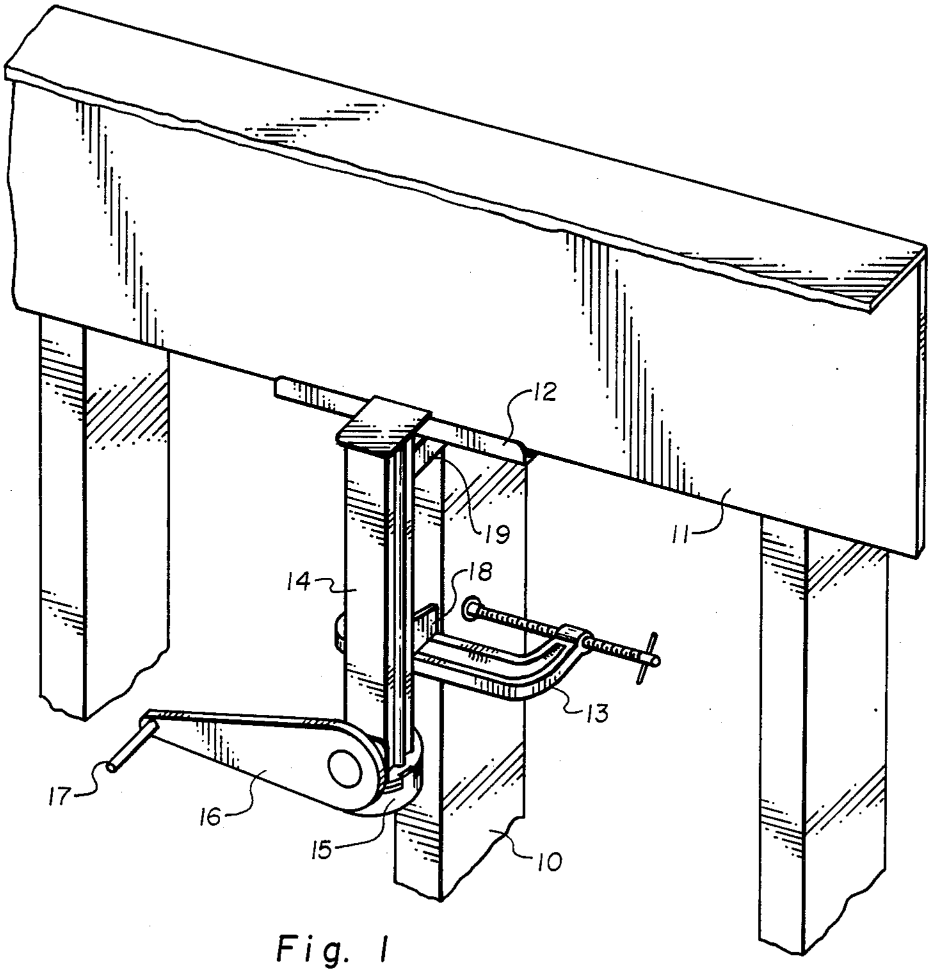
FIG. 1 is a perspective view illustrating the invention in operational position with a mountable wallboard placed in the positioning bracket.
Figure 2:
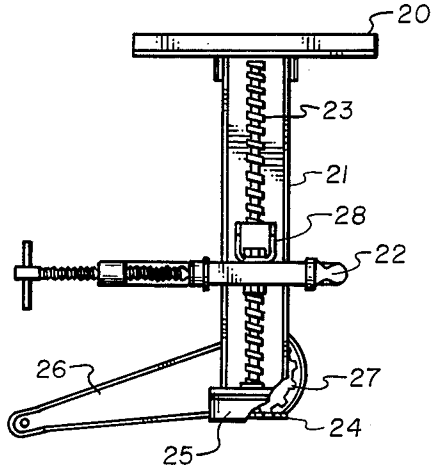
FIG. 2 is a partially fragmented elevational view showing the invention from the side opposite the operating crank.

FIG. 1 illustrates the invention in operational mode attached to a wall stud 10 and supporting a wallboard 11 in the bracket 12. The apparatus is attached to a wall stud by a C-clamp 13 which is bolted to the threaded spool extension 18. Two outwardly projecting stages are disposed inferiorly to the supporting bracket and serve to anchor the device to the wall stud and stabilize the device when in use. The primary housing 14 contains the mechanical means by which the supporting bracket may be raised to secure the wallboard in a vertical direction; different preferred embodiments of that mechanism are more fully illustrated in FIGS. 2, 3, 4 and 5. With respect to the embodiment illustrated in FIGS. 1 and 2, the invention is comprised of a primary housing 14 and a second housing 15 located beneath and in transverse orientation to the primary housing. The articulating members of the mechanisms contained in the housings are illustrated in FIG. 2. In this embodiment, a crank 16 with handle 17 is employed to originate the movement of the mechanism, more fully illustrated in FIG. 2.

In FIG. 2 the supporting bracket 20 is welded to the device at two outwardly projecting trusses, which are part of the primary housing 21. The C-clamp 22 is the illustrated means of attachment of the apparatus to a wall stud (not shown). The preferred embodiment of the mechanism illustrated in FIG. 2 is composed of a spirally threaded shaft 23 to the lower end of which is transversely attached a cogwheel 24. The cogwheel 24 is located within the mechanism housing 25 positioned below the primary housing 21. The crank 26 is fitted with an interdented disk 27 at the point of attachment of the crank to the primary housing, the disk being disposed between the crank and primary housing. As the crank is turned, causing the interdented disk of the crank to turn, the disk, articulating with the cogwheel of the threaded post, is caused to rotate thus causing the threaded post to rotate in turn. A threaded spool 28, mounted on the threaded post 23, and bolted to the C-clamp 22, causes the threaded post to ascend in the process of rotating the post. The post having reached its zenith, applies upward pressure to the primary housing 21, by means of the cogwheel mounted securely to the lower end of the post, thereby allowing for adjustment of the supporting bracket 20 and the wallboard supported therein.

Figure 3:
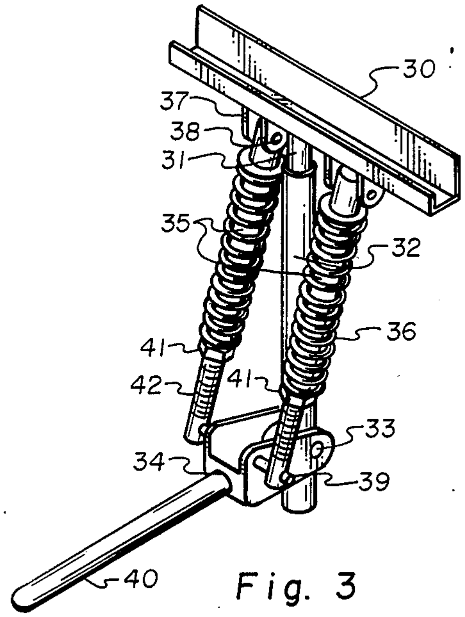
FIG. 3 is a perspective view of an alternate embodiment of the invention, but does not indicate the manner of attachment of the invention to a wall stud.

FIG. 3 demonstrates another embodiment of a mechanism for use in the invention. Note that illustration of the means of attachment of the device to a wall stud has been omitted. The supporting bracket 30 is attached to a circular shaft 31 which is situated within a hollow tube 32 which arrangement allows for the upward and downward movement of the shaft within the hollow tube. Attached to the lower end of the hollow tube by means of a pin 33 is a handle 34. Circular bars 35 are located on either side of the hollow tube and are encircled by heavy gauge springs 36. Each bar is attached at its upper end to the supporting bracket by means of attachment brackets 37 welded thereto and the bar is affixed to the attachment bracket by a pin 38. The lower ends of the bars are attached to the handle by means of a pin 39 threaded through the bar and attached to the handle. Upon placement of a wallboard in the supporting bracket 30, the mechanism of the device is engaged by lifting the lever 40 of the handle in the direction of the arrow shown which causes the bars 35 to move into a vertical position and tension of the springs is enacted by downward pressure of the wallboard on the supporting bracket. Tension on the springs can be adjusted by nuts 41 which may be rotated upwardly or downwardly on the threaded lower end of the bars 42.

Figure 4:
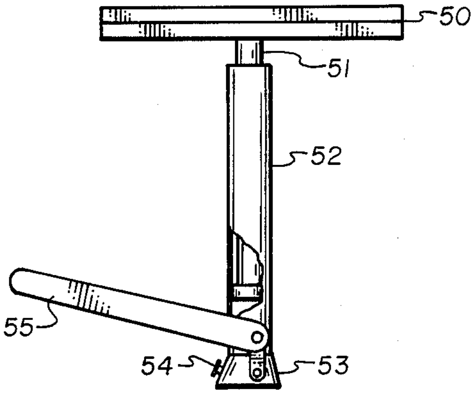
FIG. 4 is a partially fragmented elevational view of the invention in yet another alternate embodiment. The illustration does not show the manner of attachment of the device to a wall stud.

FIG. 4 illustrates yet another embodiment of a mechanism which can be employed with the invention. Illustration of the means of attachment to a wall stud has been omitted. This mechanism makes use of hydraulic pressure as a means of causing upward adjustment of the supporting bracket. In this embodiment, the supporting bracket 50 is attached to a cylindrical shaft 51. The cylindrical shaft is housed within a hollow tube 52 and movement of the shaft within the tube is allowable in an upward and downward direction. A well of hydraulic fluid is located at the enlarged lower end of the hollowed housing 53. The well of hydraulic fluid is filled through an intake valve 54. Hydraulic pressure within the hollow housing is accomplished by oscillation of the lever 55. Increasing pressure causes upward movement of the shaft within the hollow tube and thus upward adjustment of the supporting bracket. The same basic design for hydraulic actuation may be used for compressed air actuation by supplying compressed air from a separate source, through an air control valve to the device.

Figure 5:
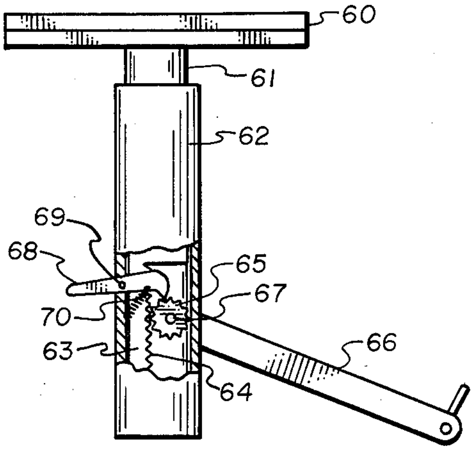
FIG. 5 is a partially fragmented elevational view taken from the side opposite the operating crank illustrating another embodiment, the illustration not indicating the manner of attachment to a wall stud.

FIG. 5 illustrates another embodiment of a mechanism of the invention. Illustration of the means of attachment of the device to a wall stud has been omitted. In this embodiment, a rack and pinion system provides the means of accomplishing upward adjustment in the supporting bracket. As illustrated in FIG. 5, the supporting bracket 60 is attached to a cylindrical shaft 61 which is situated within a tubular housing 62. The lower end of the cylindrical shaft 61 is transversely and cross-sectionally cut away and manufactured so as to produce a rack 63 with teeth 64 disposed on the inner face of the rack. A pinion 65 is located internally to the tubular housing and engages with the teeth of the rack. The pinion is mounted to the crank 66 by means of a pin 67 which projects through the wall of the tubular housing. A pawl 68 which extends through the wall of the tubular housing is attached thereto by means of a pin 69 projected laterally within the wall of the housing. The pawl serves to prevent rotation of the pinion in the opposite direction during operation of the mechanism to raise the tubular shaft and supporting bracket When it is desired to lower the rack, the pawl may be manually depressed at its external end to allow rotation of the pinion in the opposite direction. The pawl returns to its normal operational mode against the pinion by contraction of the spring 70 affixed to the inner wall of the tubular housing and the pawl.

I claim:

1. An apparatus for positioning wallboard vertically along a wall from a vertically oriented wall construction stud, comprising in combination:

- an elongated, hollow, vertically oriented support housing having an elongate aperture extending the length of the housing;
- an adjustment mechanism disposed within said housing for raising and lowering a positioning bracket, said mechanism having a combination rotary threaded shaft and spool which are driven by the rotations of the handle disposed at the base of said housing;
- a positioning bracket for supporting and positioning wallboard, said bracket being disposed exteriorly of said housing, along the housing aperture and having engagement means with said adjustment mechanism to raise and lower the bracket as the adjustment mechanism is rotated; and
- a support clamp secured to said housing for clamping the housing to a vertically oriented wall construction stud for support.

2. An apparatus as set forth in claim 1, in which the main hollow housing, bracket, clamping means and handle are made of sturdy steel material.

3. An apparatus as set forth in claim 1, in which the clamping device consists of a C-clamp means.

* * * * *